March 17, 1970    R. S. LINDROTH    3,501,645
APPARATUS FOR SWITCHING OFF A VEHICLE'S HEADLIGHTS
AND TAILLIGHTS FROM OUTSIDE THE VEHICLE
Filed Aug. 2, 1968

INVENTOR.
ROGER S. LINDROTH

BY Carl R. Brown

ATTORNEY

United States Patent Office 3,501,645
Patented Mar. 17, 1970

3,501,645
APPARATUS FOR SWITCHING OFF A VEHICLE'S HEADLIGHTS AND TAILLIGHTS FROM OUTSIDE THE VEHICLE
Roger S. Lindroth, 5498 Pennsylvania Ave., La Mesa, Calif. 92041
Filed Aug. 2, 1968, Ser. No. 749,654
Int. Cl. B60g 1/04
U.S. Cl. 307—10                    7 Claims

ABSTRACT OF THE DISCLOSURE

An apparatus for switching off a vehicle's headlights and taillights from outside the vehicle, employing the switch in the passenger compartment for switching on the vehicle's headlight and taillights, and a relay circuit operable to extinguish the headlights and taillights circuit upon being energized by a second switch that is operated from outside the vehicle, such as through operation of a door latch button actuated switch, or by actuating a switch positioned under the grill of the vehicle and which relay circuit holds the headlights and taillights in the off condition until the passenger compartment switch is returned to the off position or until the ignition switch is turned on.

BACKGROUND OF THE INVENTION

The problem of leaving the headlights and taillights of a vehicle in the on condition after the driver parks and locks the vehicle is well known. This occurs in many circumstances such as driving the car in daylight through foggy or rainy weather, where it is necessary that the lights of the vehicle be turned on, then parking the vehicle in a parking lot or the like and inadvertently not turning the lights off. The driver or owner of the vehicle is required to lock the vehicle when leaving it, thus the locked vehicle is left with the lights on. Parking lot attendants or other persons passing the vehicle are unable to turn off the lights, since the light switch is within the locked passenger compartment. Thus when the owner returns to the vehicle, the battery is either reduced to a very low condition or is dead, and it is not possible to start the vehicle. This causes considerable difficulty and stress not only to the owner or driver of the vehicle, but to parking lot attendants and others.

Thus it is advantageous to have a switch positioned on the outside of the vehicle that overrides the normal headlight and taillight switch and extinguishes the headlights and taillights by operation of the outside switch. This switch is advantageously placed in the door latch mechanism, so that pushing the normal push button door latch release will operate the override switch and extinguish the headlights and taillights. The push button on the door latch is operable even though the door is locked. Alternatively, the outside switch may be placed in a non-obvious position, such as under the grill of the vehicle where it may be operated by hand.

SUMMARY OF THE INVENTION

In an embodiment of this invention, the headlights and taillights of the vehicle are operated by the normal switch that is positioned on the dash board of the vehicle in the passenger compartment. A two-position relay controls three separate electrical contacts to first and second stable positions. Upon closing the light switch in the vehicle compartment, a first circuit is closed through one of the relay contacts that energizes the headlights and taillights. The closing of the light switch also closes a second circuit through a second contact of the relay and through one winding of the relay that places the relay winding in a position to be energized. A second switch positioned outside the vehicle upon being closed, closes the second circuit that energizes the relay winding. The relay then moves the relay contact to a first position that de-energizes the first circuit and extinguishes the headlight and taillights. A second relay contact opens the second circuit and the relay holds in the first position after the second or outside switch is released. A third contact of the relay, when moved to the first position, closes a third circuit through an opposite relay winding, that places this winding in a condition to be energized and moves all the relay contacts to a second position. The third circuit is closed by a switch contact that is closed when the dash board light switch is returned to the open position. This energizes the opposite relay winding, pulling the relay contacts to the second or normal position that places the light circuit in a condition to be operated in the normal manner. Thus the relay circuit allows the outside switch to turn off the headlights and taillights, which headlights and taillights are held in the off condition until the light switch in the vehicle is returned to the open position. A third switch means is in parallel with the second contact of the light switch in the third circuit, which third switch is closed upon turning on the vehicle's ignition. Thus when the vehicle ignition is on, operation of the outside switches are unable to hold the relay in the first position. Thus the relay stays in the second position and the outside switches are unable to deenergize the headlights and taillights. The apparatus only allows the headlights and taillights to be de-energized and held in the de-energized condition when the lights have been turned on by the dashboard light switch and the ignition switch of the vehicle is turned off. So inadvertent operation of the outside switches will not turn off the headlights and taillights that would create a dangerous condition.

It is therefore an object of this invention to provide a new and improved apparatus for switching off a vehicle's headlights and taillights from a switch positioned on the outside of the vehicle.

It is another object of this invention to provide a new and improved apparatus for switching off a vehicle's headlights and taillights that can be operated even though the vehicle passenger compartment is locked.

It is another object of this invention to provide a new and improved apparatus for switching off a vehicle's headlights and taillights from a switch outside the vehicle, only at times when the vehicle is not being operated.

It is another object of this invention to provide a new and improved apparatus for switching off a vehicle's headlights and taillights from a switch outside the vehicle, that holds the headlights and taillights in a deenergized condition until the vehicle's light switch in the passenger compartment is returned to the off position or the ignition of the vehicle is turned on.

Other objects and many advantages of this invention will become more apparent upon a reading of the following detailed description and an examination of the drawing, wherein like reference numerals designate like parts throughout and in which.

Figure 1:
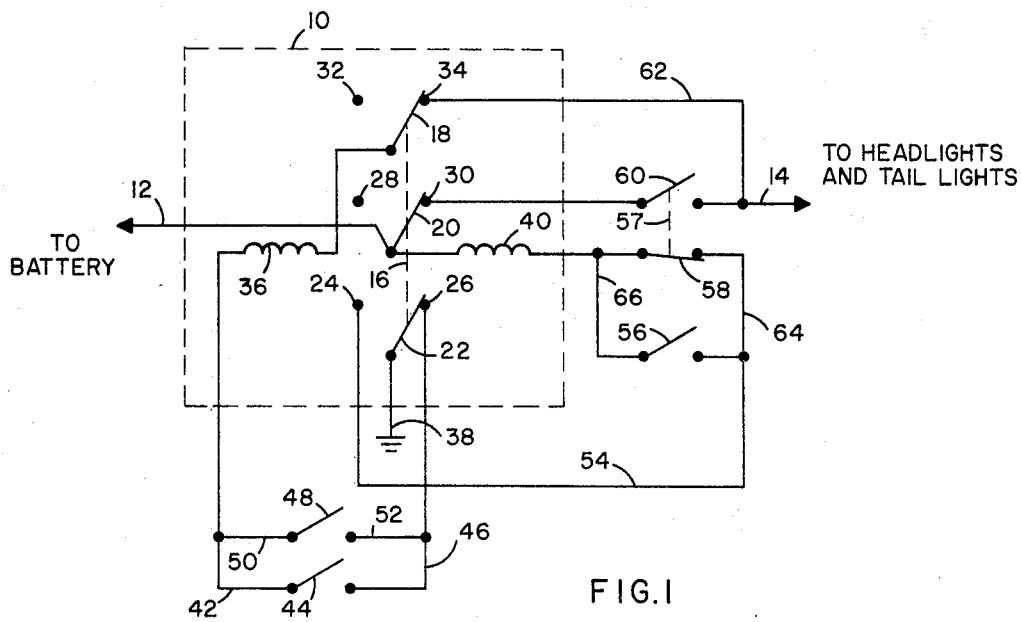
FIGURE 1 is a schematic diagram of the electrical circuit of an embodiment of this invention.

Referring to FIGURE 1, an electrical relay circuit 10 is positioned in the vehicle at any suitable place and preferably under the dash of the vehicle. A normal light switch 57, that is positioned on the dash of the vehicle, closes a switch 60 in line 14 that closes a first circuit through relay contact 20 and line 12 to provide battery power to energize the headlights and taillights. The relay has windings 36 and 40 that when separately energized, respectively pulls the relay contacts 18, 20 and 22 to first and second stable positions. As illustrated in FIGURE 1, the relay contacts 18, 20 and 22 are in the second position that is the normally stable position of the circuit. Thus when relay contact 20 is against point contact 30, the light switch 57 is able to close contact 60 and energize the headlights in the manner previously described.

Upon closing contact 60, a second circuit is established from the battery through line 12, contact 20, contact 30, closed contact 60, line 62, point contact 34, contact 18 and relay winding 36. This second circuit provides a closed circuit that supplies battery power to the relay winding 36. Thus upon closing either switch 44 or switch 48, the second circuit is closed through these respective contacts and through point contact 26, and contact 22 to ground 38. This energizes the relay winding 36 that draws the relay contacts 18, 20 and 22 to the first contact position, which is in electrical contact with point contacts 24, 28 and 32.

Upon movement of the relay contacts to the first position, the second circuit through line 62 and relay winding 36 is opened, holding the relay in the first position. Relay contact 20 is opened, which opens the first circuit to the headlights and taillights and thus the headlights and taillights are extinguished. The third relay contact 22 is moved from point contact 26 to point contact 24, which closes a third circuit from ground 38 through contact 22, point contact 24, line 54, line 64, closed contact 58, relay winding 40, and line 12 to the battery. Thus when contact 58 is closed or contact 56 is closed, the relay winding 40 is energized pulling the relay contacts to the second position as illustrated in FIGURE 1.

Contact 58 is operated by the light switch 57 within the vehicle compartment. Upon energizing the headlights and taillights by closing contact 60, the inside light switch 57 also opens contact 58. Contact 56 is closed by turning on the ignition of the vehicle. Thus it may be understood that relay 16, once energized by the closing of the light switch 57 and the second switch means 44 or 48, is moved to the first condition and is held in the first condition until the light switch 57 is moved to de-energize the headlights by opening contact 60 and closing contact 58 or the ignition switch is turned on, thereby closing a parallel current path through closed contact 56 and 66.

Figure 2:
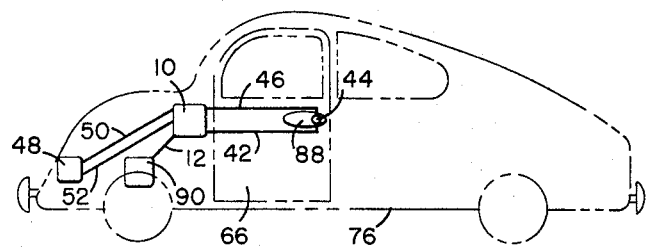
FIGURE 2 is a schematic diagram of a vehicle illustrating the positioning of the various switches and circuits in the vehicle.
Figure 3:
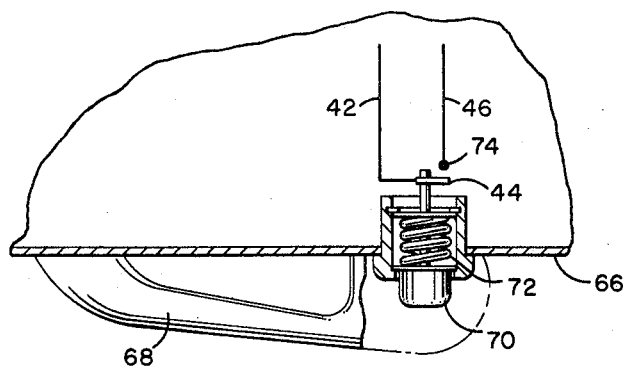
FIGURE 3 is a cross sectional view of a latch mechanism of the push button type that operates the outside switch.

The second switch means comprises a pair of switches having contacts 44 and 48 that are operated separately. Switch contact 44 for example, is operated by pushing the known push button latch release button 70 or door handle 68 of the vehicle door 66. Upon pushing button 70, switch contact 44 is moved against point contact 74 closing the electrical circuit through lines 44 and 46. Spring 72 biases the push button contact 70 to a normally open condition. A hand operated switch 48 of any suitable known design and preferably of the push button type, such as illustrated in FIGURE 3, is selectively positioned in a non-obvious place under the grill of the vehicle which switch 48 is closed by reaching in under the grill and actuating the switch. A battery 90 provides the power 12 to the relay circuit 10 as illustrated in FIGURE 2.

OPERATION

In operation, the headlights are turned on in the normal manner by closing switch contact 60. This closes a first circuit path and energizes the lights in the manner previously described. Then upon closing either or both of the outside switches 44 or 48, the relay 16 is energized to the first condition thus moving switch relay contacts 18, 20 and 22 to the first position. This immediately closes a circuit through switch contact 22 and contact 24, which circuit if open through contacts 56 and 58 will have no effect on holding the relay 16 in the first position. However, should the ignition switch 56 be on, the relay winding 40 will be energized immediately returning the relay contact to the second position and again energizing the lights. Accordingly, it is not possible to continuously de-energize the headlights when the ignition switch 56 is on. Switches 44 or 48 are of the push button type that only close when pushed, so it is not necessary to later re-operate the outside switches before turning on the lights. The relay energizing second circuit is opened upon the relay contacts 18 and 22 moving to the first position. Thus the third circuit in the manner previously described returns the relay contact 16 to the second or normal position upon de-energizing the headlight switch 57 and closing contact 58 or the turning on of the ignition and closing contact 56.

Thus I have provided a unique apparatus for turning off the headlights and taillights of a locked vehicle from a switch positioned outside the passenger compartment, which apparatus holds the headlights and taillights in a de-energized condition until such time as the light switch within the vehicle compartment is returned to the open position or the ignition switch is turned on.

Having described my invention, I now claim.

1. Apparatus for switching off a vehicle's headlights and taillights from outside a vehicle comprising,
   a first circuit for electrically connecting the vehicle's headlights and taillights to an electrical source,
   a second circuit for electrically connecting and energizing a relay means by an electrical source,
   first means for closing said first circuit and a switch contact in said second circuit,
   said relay means in the energized condition moving a switch contact in said first circuit that opens said first circuit,
   and second switch means positioned outside the vehicle for closing said second circuit after said first switch means has closed and energizing said relay to the first condition, whereby said first circuit is opened and said headlights and taillights are de-energized.

2. Apparatus for switching off a vehicle's headlights and taillights from outside the vehicle as claimed in claim 1 in which,
   said relay means in said first condition moving a second relay contact that opens said second circuit, whereby said relay is held in the first condition and the headlights and taillights are maintained de-energized after the outside second switch means is opened.

3. Apparatus for switching off a vehicle's headlights and taillights from outside the vehicle as claimed in claim 2 in which,
   said relay means in moving to said first condition, moves a third relay contact from a connection in said second circuit to a closed connection in a third circuit, said third circuit providing a circuit for energizing said relay to a second stable position,
   and said first switch means controlling a second contact in said third circuit, whereby operation of said first switch means to de-energize the headlights and taillights energizes the relay means to the second condition that moves the first, second and third relay contacts to the second position.

4. Apparatus for switching off a vehicle's headlights and taillights from outside the vehicle as claimed in claim 3 in which,
   said vehicle having doors with push button latch operating means for unlatching the doors,
   and said second switch means being closed by pushing said push button latch operating means.

5. Apparatus for switching off a vehicle's headlights and taillights from outside the vehicle as claimed in claim 3 in which,
   said second switch means being positioned within a hand reachable position in the grill of the vehicle.

6. Apparatus for switching off vehicle's headlights and taillights from outside the vehicle as claimed in claim 3 in which, said vehicle having doors with push button latch operating means for unlatching the doors, said second switch means being selectively closed by either first or second switches that are closed from outside the vehicle, said first switch being closed by pushing said push button latch operating means, and said second switch being positioned within a hand reachable position in the grill of the vehicle.

7. Apparatus for switching off a vehicle's headlights and taillights from outside the vehicle as claimed in claim 3 including, a third switch means in said third circuit and in parallel with said second contact of said first switch, and said third switch being closed when the vehicle's ignition is turned on, whereby closing said second switch means does not hold the headlights and taillights in the de-energized condition.

References Cited

UNITED STATES PATENTS

| | | |
|---|---|---|
| 2,544,955 | 3/1951 | Harrelson. |
| 2,931,918 | 4/1960 | Shapiro. |
| 3,172,080 | 3/1965 | Webb et al. _____ 315—82 X |
| 3,388,288 | 6/1968 | Kibler _____ 315—82 X |

ROBERT S. MACON, Primary Examiner

T. B. JOIKE, Assistant Examiner

U.S. Cl. X.R.

315—82